(12) United States Patent
Higashi et al.

(10) Patent No.: US 10,594,902 B2
(45) Date of Patent: Mar. 17, 2020

(54) IMAGE CONVERSION METHOD

(71) Applicant: EIZO Corporation, Ishikawa (JP)

(72) Inventors: Masafumi Higashi, Ishikawa (JP); Reo Aoki, Ishikawa (JP); Yuya Yoshida, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 59 days.

(21) Appl. No.: 15/531,892

(22) PCT Filed: Dec. 1, 2014

(86) PCT No.: PCT/JP2014/081691
§ 371 (c)(1),
(2) Date: May 31, 2017

(87) PCT Pub. No.: WO2016/008162
PCT Pub. Date: Jun. 9, 2016

(65) Prior Publication Data
US 2017/0272618 A1 Sep. 21, 2017

(51) Int. Cl.
*H04N 1/60* (2006.01)
*G09G 5/00* (2006.01)
(Continued)

(52) U.S. Cl.
CPC ............ *H04N 1/6011* (2013.01); *G09G 5/00* (2013.01); *G09G 5/02* (2013.01); *H04N 1/0044* (2013.01);
(Continued)

(58) Field of Classification Search
CPC ................................ G06F 3/1556; G06F 3/1208
See application file for complete search history.

(56) References Cited

U.S. PATENT DOCUMENTS

| | | | |
|---|---|---|---|
| 2003/0012448 A1 | 1/2003 | Kimmel et al. | |
| 2005/0190141 A1* | 9/2005 | Roth | G09G 3/002 345/102 |

(Continued)

FOREIGN PATENT DOCUMENTS

| | | |
|---|---|---|
| JP | H10-032724 A | 2/1998 |
| JP | 2002-103726 A | 4/2002 |

(Continued)

OTHER PUBLICATIONS

International Search Report dated Mar. 3, 2015 in corresponding Application No. PCT/JP2014/081691; 2 pgs.

*Primary Examiner* — King Y Poon
*Assistant Examiner* — Michael Burleson
(74) *Attorney, Agent, or Firm* — Maier & Maier, PLLC (57) ABSTRACT

Provided is an image conversion method that allows for the representation, on a display, the light and shade of a printed image obtained by printing the image on paper. The image conversion method includes a step of acquiring an illumination-light component and a reflectance component from an input image, a step of correcting the illumination-light component in accordance with display luminance information of a print mode in which the input image is to be printed, so that light and shade of the input image displayed on a display come close to light and shade of a printed image obtained by printing the input image in the print mode, and a step of acquiring a combined image by combining the corrected illumination-light component and the reflectance component or the corrected reflectance component.

4 Claims, 4 Drawing Sheets

(51) Int. Cl.
 G09G 5/02 (2006.01)
 H04N 1/00 (2006.01)
(52) U.S. Cl.
 CPC ......... H04N 1/6005 (2013.01); H04N 1/6008 (2013.01); H04N 1/6027 (2013.01); H04N 1/6052 (2013.01); H04N 1/6097 (2013.01); G09G 2340/06 (2013.01); H04N 2201/0082 (2013.01); H04N 2201/0089 (2013.01)

(56) References Cited

U.S. PATENT DOCUMENTS

| | | | |
|---|---|---|---|
| 2012/0242716 A1* | 9/2012 | Tanaka | H05B 33/0854 345/690 |
| 2015/0077805 A1* | 3/2015 | Miller | H04N 1/32309 358/3.01 |
| 2015/0123985 A1 | 5/2015 | Abe et al. | |
| 2015/0242701 A1* | 8/2015 | Tokui | H04N 5/243 382/190 |
| 2016/0307602 A1* | 10/2016 | Mertens | G11B 27/11 |

FOREIGN PATENT DOCUMENTS

| | | |
|---|---|---|
| JP | 2013-186279 A | 9/2013 |
| JP | 2013-210709 A | 10/2013 |
| WO | 02/089062 A2 | 11/2002 |

\* cited by examiner

IMAGE CONVERSION METHOD

TECHNICAL FIELD

The present invention relates to an image conversion method that allows for the representation, on a display, of the light and shade of an image obtained by printing the image on paper.

BACKGROUND ART

Not only genuine paper manufactured by printer manufacturers, but also high-end print paper (fine art paper) manufactured by domestic and overseas manufacturers (drawing material paper manufacturers, Japanese paper manufacturers) are available in the current photographic print market. However, in the case of fine art paper, the appearance of an image printed thereon differs from that of the image displayed on a display in terms the feeling of gradation (gradation characteristics). That is, the user identifies the gradation characteristics or impression of the image on the fine art paper only after the image is actually printed thereon.

Patent Literature 1 is able to show, to the user, a preview on which the smoothness, glossiness, transmittance, color tone, and the like of paper are represented, by generating preview image data on the basis of paper image data registered in a paper database and image data to be printed.

CITATION LIST

Patent Literature

[Patent Literature 1] Japanese Unexamined Patent Application Publication No. 2002-103726

SUMMARY OF INVENTION

Technical Problem

However, while the method of Patent Literature 1 allows the user to identify the smoothness, glossiness, transmittance, color tone, and the like of paper on a display, it is not able to represent, on the display, the light and shade of a printed image. For this reason, disadvantageously, a coal-black region on a display may be represented in deep gray on a print material, that is, the appearance (light and shade) of an image displayed on a display may differ from the appearance of the printed image.

The present invention has been made in view of the foregoing, and an object thereof is to provide an image conversion method that allows for the representation, on a display, of the light and shade of a printed image obtained by printing the image on paper.

Solution to Problem

One aspect of the present invention provides an image conversion method including a step of acquiring an illumination-light component and a reflectance component from an input image, a step of correcting the illumination-light component in accordance with display luminance information of a print mode in which the input image is to be printed, so that light and shade of the input image displayed on a display come close to light and shade of a printed image obtained by printing the input image in the print mode, and a step of acquiring a combined image by combining the corrected illumination-light component and the reflectance component or corrected reflectance component.

The image conversion method of one aspect of the present invention involves correcting the illumination-light component of the input image in accordance with the display luminance information of the print mode in which the input image is to be printed and thus allows the light and shade of the input image displayed on the display to come close to the light and shade of the input image printed in the print mode (hereafter referred to as "the printed image"). Since the light and shade of the printed image are represented on the display by correcting not the entire input image but the illumination-light component of the input image, the light and shade of the printed image can be represented on the display with the texture or local contrast of the input image maintained.

Various embodiments of the present invention are described below. The embodiments below can be combined with each other.

Preferably, the display luminance information includes a print luminance value at which a predetermined sample is printed and a display luminance value of the sample image printed at the print luminance value.

Preferably, the print luminance value is a value of 25% or less of an entire luminance range.

Preferably, the illumination-light component is corrected by adding, to pixels in the illumination-light component, correction value calculated using a correction function having the print luminance value and the display luminance value as parameters.

Preferably, the correction function is a function whose value is increased as luminance values of the pixels are reduced.

Another aspect of the present invention provides an image conversion method including a step of correcting an input image in accordance with display luminance information of a print mode in which the input image is to be printed, so that light and shade of the input image displayed on a display come close to light and shade of a printed image obtained by printing the input image in the print mode. The display luminance information includes a print luminance value at which a predetermined sample is printed and a display luminance value of the sample image printed at the print luminance value, and the print luminance value is a value of 25% or less of an entire luminance range.

Preferably, the input image is corrected by adding, to pixels in the input image, correction value calculated using a correction function having the print luminance value and the display luminance value as parameters.

Preferably, the correction function is a function whose value is increased as luminance values of the pixels are reduced.

DETAILED DESCRIPTION

Now, embodiments of the present invention will be described with reference to the drawings. Various features described in the embodiments below can be combined with each other.

1. First Aspect of Invention

An image conversion method of an embodiment of a first aspect of the present invention includes a step of acquiring an illumination-light component L and a reflectance component R from an input image S, a step of correcting the illumination-light component L in accordance with display luminance information of a print mode in which the input image S is to be printed, so that light and shade of the input image S on a display come close to light and shade of a printed image obtained by printing the input image S in the print mode, and a step of acquiring a combined image by combining the corrected illumination-light component L' and the reflectance component R or corrected reflectance component.

Figure 1:
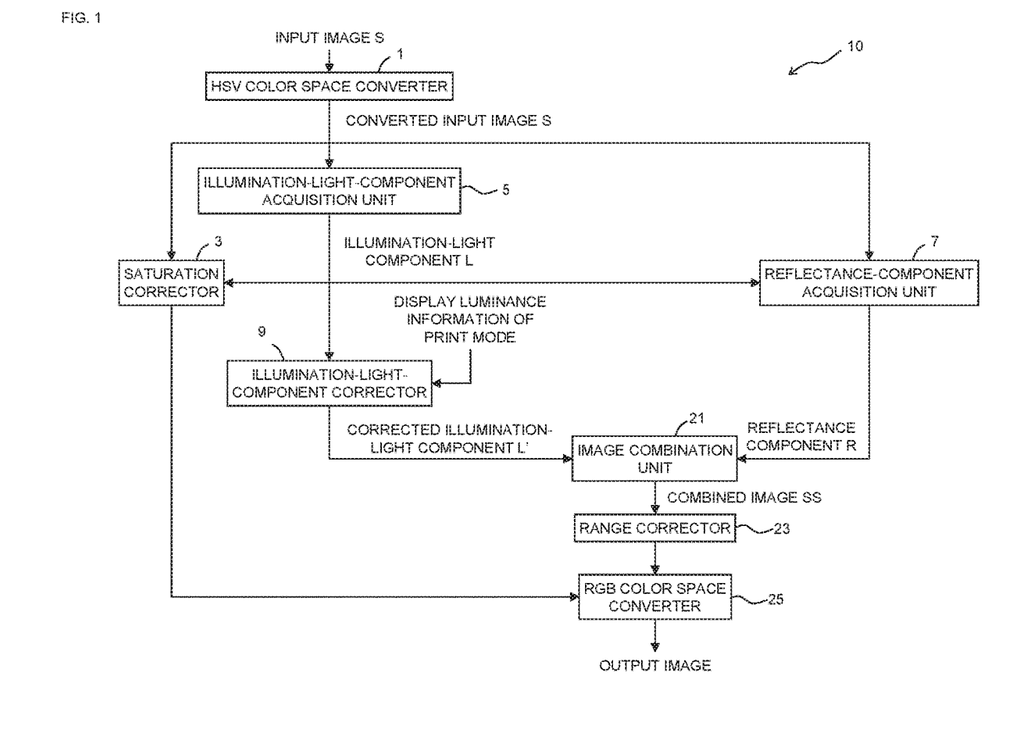
FIG. 1 is a block diagram of an image conversion device of an embodiment of a first aspect of the present invention.

While this image conversion method may be performed by any configuration, it can be performed by, for example, an image conversion device 10 shown in FIG. 1. Hereafter, the image conversion method of the present embodiment will be described through the description of the image conversion device 10. In one embodiment, the image conversion device 10 is included in an image display device including a display, and an output image outputted from the image conversion device 10 is displayed on the display of the image display device.

(1-1) Conversion of Input Image

The input image S inputted to the image conversion device 10 is first inputted to an HSV color space converter 1. The HSV color space converter 1 converts the RGB color space of the input image S into HSV color space. The RGB color space is converted into HSV color space using a typical conversion formula. Use of HSV color space allows for the elimination of saturation reduction effects caused by the adjustment of brightness using YUV color space and for visually favorable brightness correction. If the RGB channels are independently processed, color drift may occur; in the present embodiment, the RGB color space of the input image S is converted into HSV color space and then the V component (lightness component) alone is processed, thereby preventing color drift. Note that if the input image S is represented by HSV color space, the HSV color space converter 1 need not be provided. Also, the present invention may be applied to any type of color space other than HSV color space. However, a color space whose lightness or luminance can be changed independently of the color components is preferred in terms of the prevention of color drift. In addition to HSV color space, HLS color space is preferred.

(1-2) Acquisition of Illumination-Light Component and Reflectance Component

The converted input image S is inputted to a saturation corrector 3, an illumination-light-component acquisition unit 5, and a reflectance-component acquisition unit 7.

The illumination-light-component acquisition unit 5 is an edge-preserving low-pass filter and acquires the illumination-light component L of the input image S by calculating the weighted average of local brightness of the input image S. The illumination-light component L is inputted to the saturation corrector 3, an illumination-light-component corrector 9, and the reflectance-component acquisition unit 7.

The saturation corrector 3 calculates a correction value for correcting the saturation of a low-gradation region, on the basis of the input image S and illumination-light component L. If the saturation need not be corrected, the saturation corrector 3 may be omitted.

The reflectance-component acquisition unit 7 acquires the reflectance component R of the input image S on the basis of the Retinex theory. Details of the Retinex theory are described in Japanese Unexamined Patent Application Publication (Translation of PCT Application) No. 2005-515515 and the like. According to the Retinex theory, the following relationship holds true: input image S=illumination-light component L×reflectance component R. The reflectance-component acquisition unit 7 calculates the log value (log R) of the reflectance component R from the log difference between the input image S and illumination-light component L on the basis of this relationship and acquires the reflectance component R from this log value. Note that the reflectance-component acquisition unit 7 need not necessarily acquire the reflectance component R using the method described above. For example, the reflectance-component acquisition unit 7 may directly acquire the reflectance component R from the input image S by applying a high-pass filter to the input image S. The acquired reflectance component R may be directly inputted to an image combiner 21, or may be subjected to a predetermined correction process and then inputted to the image combiner 21. Specifically, this correction process is performed by increasing the amplitude of the reflectance component R as disclosed in Japanese Unexamined Patent Application Publication No. 2013-210709.

(1-3) Correction of Illumination-Light Component

The illumination-light component corrector 9 corrects the gradation of the illumination-light component L and outputs the corrected illumination-light component L'. In the present embodiment, the corrected illumination-light component L' is calculated on the basis of the following Formula 1:

$$L'=LGain \times L1+(1-LGain) \times L+F(L,Y1,Y2) \quad \text{Formula 1}$$

Figure 2:
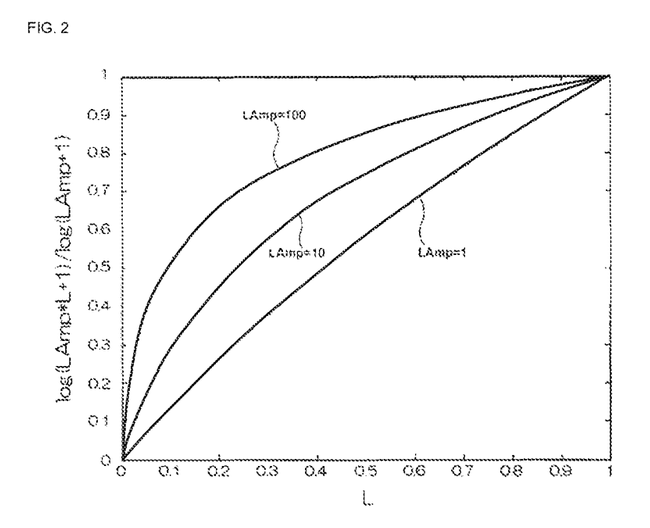
FIG. 2 shows a graph obtained from Formula 2.

LGain is a parameter for determining the mixing ratio when generating a combined image of a correction component L1 and the original illumination-light component L. The correction component L1 is a value calculated on the basis of the following Formula 2. As described in Japanese Unexamined Patent Application Publication No. 2013-210709 in detail, the correction component L1 is a correction component for improving the viewability of the dark region deteriorated due to the compression of the dynamic range and reproducing the original appearance of the image. Since, in the present embodiment, a correction function F (L,Y1,Y2) is used in the correction of the illumination-light component L as described below, the correction component L1 need not necessarily be used. Accordingly, LGain may be 0.

$$L1=(\log(LAmp*L+1))/(\log(LAmp+1)) \quad \text{Formula 2}$$

In Formula 2, LAmp is a parameter for adjusting the degree of emphasis of the low-gradation region. As shown in FIG. 2, as the value of LAmp is increased, the low-gradation region rises faster and the illumination-light component L is corrected so as to become brighter. Also, as shown in FIG. 2, regardless of the value of LAmp, as L approaches 0, the correction component L1 also approaches 0. For this reason, if the correction component L1 is used, it is difficult to correct the illumination-light component L in such a manner that larger correction values are added to pixels having smaller luminance values in the illumination-light component L. For example, if the input image S is printed on matte paper, a region which should be represented in coal black in the input image S (a region having a luminance value of 0) may become gray (the luminance value is, for example, 0.1 in a range of 0 to 1) in a printed image on the matte paper (that is, the shadow region may appear to be floating). To represent, on a display, the light and shade of the printed image on the matte paper, it is necessary to convert a region having a luminance value of 0 in the input image into a region having a luminance value of 0.1. If the correction component L1 is used, it is difficult to perform such conversion and therefore to accomplish the object of representing, on a display, the light and shade of a printed image obtained by printing the image on paper.

Figure 3:
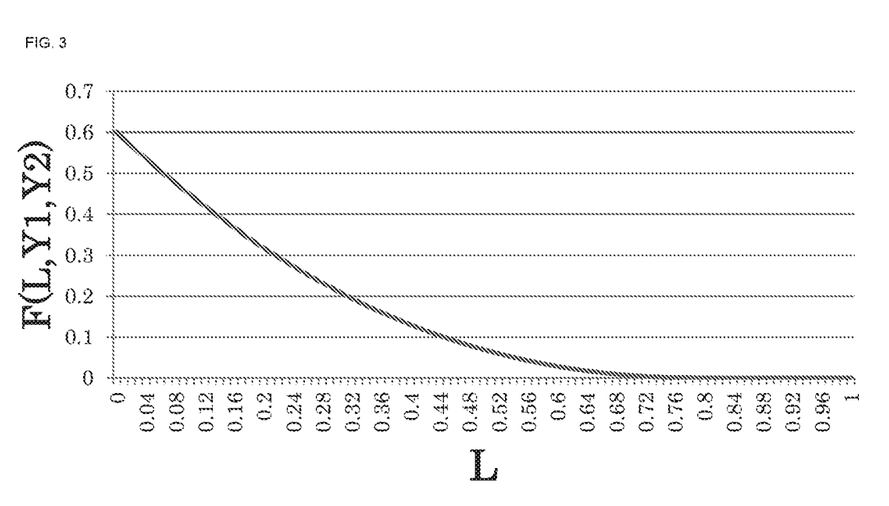
FIG. 3 shows a graph obtained from Formula 3.

For this reason, the method of the present embodiment involves adding correction values calculated using a correction function F(L,Y1,Y2) represented by Formula 3 to the luminance values. Thus, the method allows for the representation, on a display, the light and shade of a printed image obtained by printing the image on paper.

[Formula 3]

$$F(L, Y1, Y2) = \begin{cases} \alpha\left(-\frac{1}{\beta}L+1\right)^{\gamma(Y2-Y1)} & L \leq \beta \\ 0 & \text{otherwise} \end{cases} \quad \text{Formula 3}$$

where
L: the original illumination-light component (0≤L≤1);
Y1: the luminance value (print luminance value) on a computer when a solid color image (an image having a constant luminance value in a predetermined region) is printed as a sample image (0≤Y1≤1);
Y2: the luminance value (display luminance value) of the sample image printed at the print luminance value Y1 (0≤Y2≤1);
α, β, γ: constants (0≤α1, 0<β≤1, 0≤γ); and
Y1≤Y2

As an example, a graph indicating the correction function F(L,Y1,Y2) when α=0.6, β=0.8, and γ(Y2−Y1)=2.2 is shown in FIG. 3. This correction function is a function whose value is increased as the value of the horizontal axis L (the luminance values of the pixels in the illumination-light component L) is reduced. By adding the correction values calculated using this correction function to the pixels of the illumination-light component L, the light and shade of an image, whose shadow region may appear to be floating when printed, as described above, can be represented on a display.

α, β, and γ are constants and therefore can be set such that the correction values become appropriate values. Y1 and Y2 can be determined using the following method.

First, the luminance value (print luminance value) Y1 of the sample image to be printed is set. The value of the print luminance value Y1 may be any value. However, for example, the print luminance value Y1 is preferably set to a value of 25% or less of the entire luminance range (0 to 1), more preferably set to a value of 10% or less thereof, even more preferably set to a value of 0% thereof. This is because the difference in light and shade between the input image S and the printed image tends to be larger at low luminances.

Subsequently, the sample image is printed on the target paper at the print luminance value Y1, and the luminance value (display luminance value) Y2 of the printed sample image is acquired. Among methods for acquiring the display luminance value Y2 are (A) a method of measuring the luminance value (display luminance value) Y2 of the printed sample image using a luminance sensor and (B) a method including displaying the sample image on a display, changing the luminance value of the sample image on the display so that the appearance of the sample image on the display and the appearance of the printed sample image match each other, and acquiring, as the display luminance value Y2, the luminance value of the sample image on the display when the appearances match each other. The method (A) has an advantage that the display luminance value Y2 can follow changes in the environment; the method (B) has an advantage that a luminance sensor is not needed.

The degree of light and shade with which the sample image is printed is influenced by the print mode in which the sample image is printed. For this reason, the display luminance value Y2 reflects the print mode. The print mode consists of factors having an influence on the light and shade of an image to be printed, such as the paper type, tonner or ink type, printer type, and ambient temperature. As the print mode, the user may specify only the paper type, or may specify only the paper type and tonner or ink type, or may specify more factors. The paper type may be specified on a paper category basis, such as normal paper, glossy paper, or matte paper, or may be specified on a product number basis. The tonner or ink type may be specified only on whether printing is performed using a toner or ink, or may be specified on a product number basis. The printer type may be specified on a printer category basis, such as laser printer or inkjet printer, or may be specified on a product number basis.

For example, when the input image S is printed in a print mode in which the display luminance value Y2 of the sample image printed with a print luminance value Y1 of 0 becomes 0.1, the shadow region of the printed image appears to be floating. Such light and shade of the printed image can be represented on a display by correcting the illumination-light component L on the basis of Formula 1 above. Thus, the user can check the appearance (light and shade) of the input image S before the input image S is actually printed.

Examples of a method for acquiring the print luminance value Y1 and display luminance value Y2 include (1) hardware (HW) presetting, (2) acquisition from an external computer, and (3) acquisition from a luminance sensor.

(1-3-1) HW Presetting

There are two types of HW presetting: complete presetting and manual presetting.

1. Complete presetting: during the development of the image conversion device 10, several print modes (e.g., paper types) are previously stored in the storage of the image conversion device 10 so as to be associated with the luminance values Y1, Y2; and the user acquires the luminance values Y1, Y2 by specifying any print mode using an on-screen display (OSD) or the like.
2. Manual presetting: the user previously acquires luminance values Y1, Y2 using the above method and stores them in the storage of the image conversion device 10; and the user calls the stored luminance values Y1, Y2 from the storage when necessary. The luminance values Y1, Y2 may be stored so as to be associated with print modes such as paper types, or may be stored so as to be simply associated with memory identifiers such as memory numbers.

(1-3-2) Acquisition from External Computer

Information similar to that used in HW presetting is previously stored in the storage of an external computer. When the user specifies any print mode or memory identifier on the image conversion device 10 or external computer, luminance values Y1, Y2 corresponding to the specified print mode or memory identifier are read from the storage of the external computer and transmitted to the image conversion device 10.

(1-3-3) Acquisition from Luminance Sensor

The luminance values Y1, Y2 can be acquired using a luminance sensor as follows: a sample image is previously printed using a particular print luminance value Y1; and then the display luminance value Y2 of the printed sample image is measured using a luminance sensor connected to the image conversion device 10 or an external computer. The luminance sensor may be a camera. This method has an advantage that the display luminance value Y2 can follow changes in the environment (e.g., changes in the illumination condition).

While, in the present embodiment, the print luminance value Y1 and display luminance value Y2 are acquired using a solid color image as a sample image, the print luminance value Y1 and display luminance value Y2 may be acquired using a sample image other than a solid color image. Any type of image may be used as a sample image as long as the print luminance value Y1 and display luminance value Y2 can be associated with each other one-on-one. The print luminance value Y1 and display luminance value Y2 of the present embodiment correspond to "display luminance information" in Claims. The term "display luminance information" refers to information indicating the luminance at which an image printed in a predetermined print mode is displayed and may be information other than the luminance values Y1, Y2.

The above Formula 3 is one example of a correction function, and other forms of correction function having the print luminance value Y1 and display luminance value Y2 as parameters may be used.

(1-4) Generation of Combined Image, Range Correction, and Conversion of Color Space An image combination unit 21 generates a combined image SS by combining the corrected illumination-light component L' and reflectance component R. This combination may be performed in accordance with the following Formula 4 on the basis of the Retinex theory:

Combined image $SS$=corrected illumination-light component $L'$×reflectance component $R$        Formula 4

Subsequently, a range corrector 23 corrects the range of the combined image SS. The range correction is performed on the V component of the combined image SS in accordance with, for example, a method disclosed in Japanese Unexamined Patent Application Publication No. 2013-210709 and thus the brightness of the entire image is corrected. Note that if range correction is not needed, the range corrector 23 may be omitted.

Subsequently, an RGB color space converter 25 converts the HSV color space of the range-corrected combined image SS into RGB color space and outputs the resulting combined image SS. In this conversion process, the saturation of the low-gradation region may be corrected on the basis of the correction value calculated by the saturation corrector 3.

When the output image obtained using the above method is displayed on a display, the light and shade of a printed image obtained by printing the input image S in a specified print mode can be represented on the display.

2. Second Aspect of Invention

A second aspect of the present invention can be grasped as the correction of an input image on the basis of display luminance information at low luminance values. The difference in light and shade between an input image S and a printed image tends to be greater at low luminance values. For this reason, by correcting the input image on the basis of display luminance information at low luminance values, the light and shade of a printed image obtained by printing the input image S in an intended print mode can be represented on a display with high accuracy.

Specifically, the second aspect of the present invention provides an image conversion method including a step of correcting an input image S in accordance with display luminance information of a print mode in which the input image S is to be printed, so that light and shade of the input image S displayed on a display come close to light and shade of a printed image obtained by printing the input image S in the print mode. The display luminance information includes a print luminance value Y1 at which a predetermined sample is printed and a display luminance value Y2 of the sample image printed at the print luminance value Y1. The print luminance value Y1 is a value of 25% or less of an entire luminance range.

Figure 4:
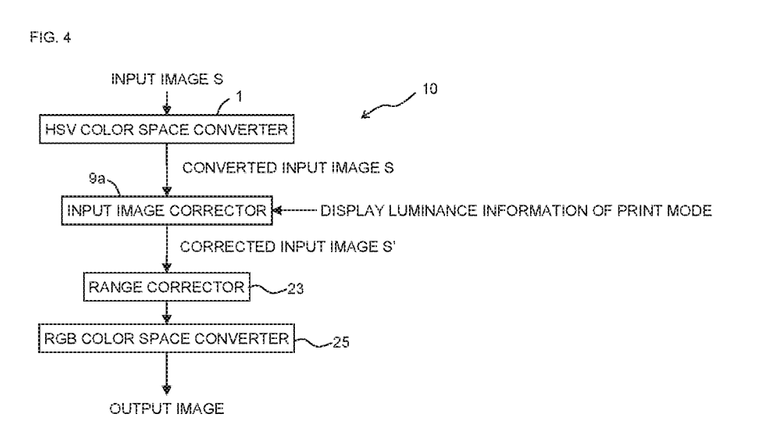
FIG. 4 is a block diagram of an image conversion device of an embodiment of a second aspect of the present invention.

While this image conversion method may be performed by any configuration, it can be performed by an image conversion device 10 shown in FIG. 4. Hereafter, the image conversion method of the present embodiment will be described through the description of the image conversion device 10.

(2-1) Conversion of Input Image

The input image S inputted to the image conversion device 10 is first inputted to an HSV color space converter 1 and thus the color space thereof is converted into HSV color space. The conversion of the input image by the HSV color space converter 1 is as described in "(1-1) Conversion of Input Image."

(2-2) Correction of Input Image

The converted input image S is inputted to an input image corrector 9a. The input image corrector 9a corrects the gradation of the input image S and outputs the corrected input image S'.

In the present embodiment, the corrected input image S' is calculated on the basis of the following Formula 5:

$S'=S+F(S,Y1,Y2)$        Formula 5

$F(S,Y1,Y2)$ is a correction function obtained by replacing L of Formula 3 with S ($0 \le S \le 1$). $F(S,Y1,Y2)$ is similar to $F(L,Y1,Y2)$ described in "(1-3) Correction of Illumination-Light Component" except that S is used in place of L. Note that this aspect of the present invention is characterized in that the input image S is corrected on the basis of display luminance information at low luminance values. For this reason, the print luminance value Y1 is set to a value of 25% or less of the entire luminance range. The print luminance value Y1 is preferably set to 10% or less, more preferably set to 0%.

(2-3) Range Correction and Conversion of Color Space

Subsequently, a range corrector 23 corrects the range of the corrected input image S'. The range correction is performed on the V component of the corrected input image S' in accordance with, for example, the method disclosed in Japanese Unexamined Patent Application Publication No. 2013-210709 and thus the brightness of the entire image is corrected.

Subsequently, an RGB color space converter 25 converts the HSV color space of the range-corrected corrected input image S' into RGB color space and outputs the converted corrected input image S' as an output image.

When the output image obtained using the above method is displayed on a display, the light and shade of a printed image obtained by printing the input image S in a specified print mode can be represented on the display.

The invention claimed is:

1. An image conversion device comprising:
one or more memory; and
at least one processor communicatively coupled to the one or more memory, the processor operable for:

a step of acquiring an illumination-light component from an input image;

a step of acquiring a reflectance component from the input image;

a step of correcting the illumination-light component in accordance with display luminance information of a print mode in which the input image is to be printed, so that light and shade of the input image displayed on a display come close to light and shade of a printed image obtained by printing the input image in the print mode; and a step of acquiring a combined image by combining the corrected illumination-light component and the reflectance component or corrected reflectance component, and wherein the input image is separated into a low frequency component and a high frequency component, the low frequency component is the illumination-light-component, and the high frequency component is the reflectance-component, the display luminance information includes a print luminance value at which a predetermined sample is printed and a display luminance value of the sample image printed at the print luminance value, the illumination-light component is corrected by adding, to pixels in the illumination-light component, correction value calculated using a correction function having the print luminance value and the display luminance value as parameters, and the correction function is a function whose value is increased as luminance values of the pixels are reduced.

2. The image conversion device of claim 1, wherein the print luminance value is a value of 25% or less of an entire luminance range.

3. An image conversion device comprising:
one or more memory; and
at least one processor communicatively coupled to the one or more memory, the processor operable for a step of correcting an input image in accordance with display luminance information of a print mode in which the input image is to be printed, so that light and shade of the input image displayed on a display come close to light and shade of a printed image obtained by printing the input image in the print mode, wherein the display luminance information includes a print luminance value at which a predetermined sample is printed and a display luminance value of the sample image printed at the print luminance value, the print luminance value is a value of 25% or less of an entire luminance range, wherein the entire luminance range is represented on the display, the input image is corrected by adding, to pixels in the input image, correction value calculated using a correction function having the print luminance value and the display luminance value as parameters, and the correction function is a function whose value is increased as luminance values of the pixels are reduced.

4. An image conversion device comprising:
one or more memory; and
at least one processor communicatively coupled to the one or more memory, the processor operable for:
a step of acquiring an illumination-light component from an input image;

a step of acquiring a reflectance component from the input image;

a step of correcting the illumination-light component in accordance with display luminance information of a print mode in which the input image is to be printed, so that light and shade of the input image displayed on a display come close to light and shade of a printed image obtained by printing the input image in the print mode; and a step of acquiring a combined image by combining the corrected illumination-light component and the reflectance component or corrected reflectance component, and wherein, the input image is separated into a low frequency component and a high frequency component, the low frequency component is the illumination-light-component, and the high frequency component is the reflectance-component, the display luminance information includes a print luminance value at which a predetermined sample is printed and a display luminance value of the sample image printed at the print luminance value, the illumination-light component is corrected by adding, to pixels in the illumination-light component, correction value calculated using a correction function having the print luminance value and the display luminance value as parameters, the correction function is a function whose value is increased as luminance values of the pixels are reduced, and the correction function is represented by a function F as below, $$F(L, Y1, Y2) = \begin{cases} \alpha\left(-\frac{1}{\beta}L+1\right)^{\gamma(Y2-Y1)} & L \leq \beta \\ 0 & \text{otherwise} \end{cases}$$

where
L: the original illumination-light component ($0 \leq L \leq 1$);
Y1: the luminance value (print luminance value) on a computer when a solid color image (an image having a constant luminance value in a predetermined region) is printed as a sample image ($0 \leq Y1 \leq 1$);
Y2: the luminance value (display luminance value) of the sample image printed at the print luminance value Y1 ($0 \leq Y2 \leq 1$);
$\alpha, \beta, \gamma$: constants ($0 \leq \alpha \leq 1$, $0 < \beta \leq 1$, $0 \leq \gamma$); and
Y1≤Y2.

* * * * *